United States Patent
Ozawa et al.

(10) Patent No.: US 12,454,149 B2
(45) Date of Patent: Oct. 28, 2025

(54) WHEEL AND MANUFACTURING METHOD OF WHEEL

(71) Applicant: Honda Motor Co., Ltd., Tokyo (JP)

(72) Inventors: Tetsuya Ozawa, Saitama (JP); Kanji Matsumoto, Saitama (JP); Keiya Hoshino, Saitama (JP); Tsutomu Shimojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 503 days.

(21) Appl. No.: 17/958,438

(22) Filed: Oct. 3, 2022

(65) Prior Publication Data

US 2023/0166558 A1 Jun. 1, 2023

(30) Foreign Application Priority Data

Nov. 29, 2021 (JP) ................................ 2021-192922

(51) Int. Cl.
 *B60B 19/00* (2006.01)
 *B29C 70/68* (2006.01)
 *B29L 31/32* (2006.01)
 *B60B 19/12* (2006.01)

(52) U.S. Cl.
 CPC ............ *B60B 19/003* (2013.01); *B29C 70/68* (2013.01); *B60B 19/12* (2013.01); *B29L 2031/32* (2013.01)

(58) Field of Classification Search
 CPC .. B60B 19/003; B60B 19/12; B60B 2900/113
 See application file for complete search history.

(56) References Cited

U.S. PATENT DOCUMENTS

| | | |
|---|---|---|
| 2016/0303898 A1 | 10/2016 | Yoshino et al. |
| 2021/0188001 A1 | 6/2021 | Yan |
| 2021/0291587 A1 | 9/2021 | Su |

FOREIGN PATENT DOCUMENTS

| | | | |
|---|---|---|---|
| JP | H07279982 | 10/1995 | |
| JP | 2011063156 | 3/2011 | |
| JP | 2012172774 | 9/2012 | |
| JP | 2016203681 | 12/2016 | |
| JP | 2016203908 | 12/2016 | |
| JP | 2020059451 | 4/2020 | |
| JP | 2020520843 | 7/2020 | |
| JP | 6746655 | 8/2020 | |
| WO | WO-0246031 A1 * | 6/2002 | ........... B60B 19/003 |

OTHER PUBLICATIONS

"Office Action of Japan Counterpart Application", issued on May 7, 2024, with English translation thereof, p. 1-p. 6.

* cited by examiner

*Primary Examiner* — S. Joseph Morano
*Assistant Examiner* — Alex Palmer
(74) *Attorney, Agent, or Firm* — JCIPRNET

(57) ABSTRACT

The disclosure provides a wheel for an omnidirectional moving device which takes fewer man-hours for manufacturing, and a manufacturing method of the wheel for an omnidirectional moving device which takes fewer man-hours. The wheel includes an annular core body 36; a plurality of bearings 75 each including an inner ring 76 and an outer ring 77 relatively rotatable with respect to the inner ring, and the inner ring being fixed to an outer peripheral surface of the core body; and a plurality of rollers 37 each fixed to the outer ring and rotatably supported by the core body via the bearing. The inner ring is tightened and fitted to the core body.

20 Claims, 10 Drawing Sheets

WHEEL AND MANUFACTURING METHOD OF WHEEL

CROSS-REFERENCE TO RELATED APPLICATION

This application claims the priority benefits of Japanese application no. 2021-192922, filed on Nov. 29, 2021. The entirety of the above-mentioned patent application is hereby incorporated by reference herein and made a part of this specification.

BACKGROUND

Technical Field

The disclosure relates to a wheel and a manufacturing method of the wheel.

Description of Related Art

Patent Literature 1 (Japanese Patent No. 6746655) discloses a wheel attached to an inverted pendulum type vehicle, and a manufacturing method thereof. The wheel includes a polygonal core body and a plurality of free rollers rotatably attached to the core body. The core body is rotatable around an axis, which extends in the left-right direction, as the center of rotation and each of the free rollers is rotatable around an axis, which is parallel to the tangent in contact with the outer surface of the polygonal core body, as the center of rotation. The inverted pendulum type vehicle can move in all directions by the rotation of the core body and the free rollers.

The wheel is manufactured by inserting a pipe material into an inner ring of a bearing, to which the free rollers are rotatably attached, fixing the inner ring to the pipe material, and then forming the pipe material into an annular shape. The fixing of the inner ring is performed by bending a claw portion formed on the core body and bringing it into contact with an end surface of the inner ring in the axial direction.

When manufacturing the wheel described in Patent Literature 1, it is necessary to bend the claw portion for each free roller in order to prevent the inner ring from moving. Since the wheel is provided with a plurality of free rollers, it is necessary to repeatedly perform the process of bending the claw portion, which takes man-hours.

SUMMARY

An aspect of the disclosure provides a wheel (17) which includes: an annular core body (36); a plurality of bearings (75) each including an inner ring (76) and an outer ring (77) relatively rotatable with respect to the inner ring, the inner ring being fixed to an outer peripheral surface of the core body; and a plurality of rollers (37) each fixed to the outer ring and rotatably supported by the core body via the bearing. The inner ring is tightened and fitted to the core body.

An aspect of the disclosure provides a wheel (17) which includes: an annular core body (36); a plurality of bearings (75) each including an inner ring (76) and an outer ring (77) relatively rotatable with respect to the inner ring, the inner ring being fixed to an outer peripheral surface of the core body; a plurality of rollers (37) each fixed to the outer ring and rotatably supported by the core body via the bearing; and collar members (80) fixed to the core body on both sides of the roller in an axial direction and having a circular inner hole smaller than an inner diameter of the inner ring. The collar members are tightened and fitted to the core body.

An aspect of the disclosure provides a manufacturing method of a wheel (17) which includes an annular core body (36), a plurality of bearings (75) each including an inner ring (76) fixed to the core body and an outer ring (77) relatively rotatable with respect to the inner ring, and a plurality of rollers (37) each fixed to the outer ring to be rotatably supported by the core body via the bearing. The manufacturing method of the wheel includes: a mounting step of mounting the bearings to which the rollers are fixed on a pipe material (81); a positioning step of positioning the bearings; a pressurizing step of fixing the inner ring to the pipe material by injecting a fluid into an inner hole of the pipe material and pressurizing the pipe material; and a molding step of forming the core body from the pipe material to which the inner ring is fixed.

An aspect of the disclosure provides a manufacturing method of a wheel (17) which includes an annular core body (36), a plurality of bearings (75) each including an inner ring (76) fixed to the core body and an outer ring (77) relatively rotatable with respect to the inner ring, and a plurality of rollers (37) each fixed to the outer ring to be rotatably supported by the core body via the bearing. The manufacturing method of the wheel includes: a mounting step of respectively mounting the bearing to which the roller is fixed and two collar members (80) having an inner diameter smaller than an inner diameter of the inner ring on a pipe material (81) so that the collar members face each other via the bearing; a positioning step of positioning the collar members to be close to the inner ring; a pressurizing step of fixing the collar members to the pipe material by injecting a fluid into an inner hole of the pipe material and pressurizing the pipe material; and a molding step of forming the core body from the pipe material to which the inner ring is fixed.

DESCRIPTION OF THE EMBODIMENTS

Figure 1:
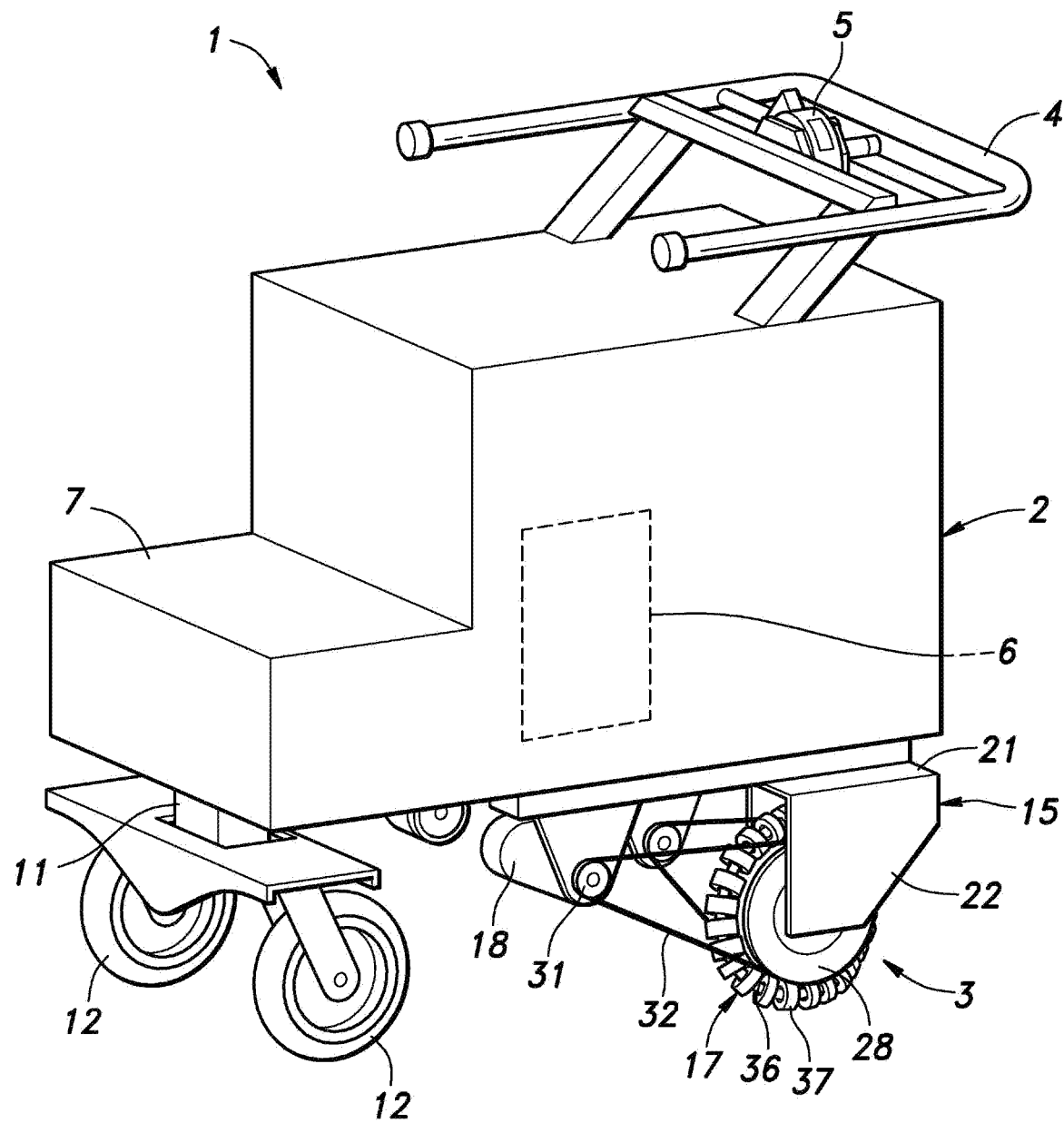
FIG. 1 is a perspective view of a cart which uses the omnidirectional moving device including the wheel manufactured by the manufacturing method according to an embodiment.

The disclosure provides a wheel for an omnidirectional moving device which takes fewer man-hours for manufacturing, and a manufacturing method of the wheel for an omnidirectional moving device which takes fewer man-hours.

An aspect of the disclosure provides a wheel (17) which includes: an annular core body (36); a plurality of bearings (75) each including an inner ring (76) and an outer ring (77) relatively rotatable with respect to the inner ring, the inner ring being fixed to an outer peripheral surface of the core body; and a plurality of rollers (37) each fixed to the outer ring and rotatably supported by the core body via the bearing. The inner ring is tightened and fitted to the core body.

According to this aspect, since the inner ring can be fixed to the core body by expanding the diameter of the core body and tightening and fitting the inner ring of the bearing to the core body, a process of fixing each inner ring to the core body is not required. It is possible to provide a wheel for an omnidirectional moving device in which the roller is rotatably supported by the core body via the bearing, and which takes fewer man-hours for manufacturing.

An aspect of the disclosure provides a wheel (17) which includes: an annular core body (36); a plurality of bearings (75) each including an inner ring (76) and an outer ring (77) relatively rotatable with respect to the inner ring, the inner ring being fixed to an outer peripheral surface of the core body; a plurality of rollers (37) each fixed to the outer ring and rotatably supported by the core body via the bearing; and collar members (80) fixed to the core body on both sides of the roller in an axial direction and having a circular inner hole smaller than an inner diameter of the inner ring. The collar members are tightened and fitted to the core body.

According to this aspect, the collar members can be fixed to the core body by expanding and deforming the core body to tighten and fit the collar members to the core body. Further, since the collar members are locked on both sides of the roller in the axial direction, the movement of the roller in the direction along the core body is restricted by the collar members, and the wheel is formed. Thus, a process of fixing each inner ring to the core body is not required, and it is possible to provide a wheel which takes fewer man-hours for manufacturing. In addition, when the core body is expanded and deformed, a load is applied from the collar member to the pipe material to resist the deformation. Therefore, as compared with the case where the collar member is not provided, the load due to the expansion and deformation of the pipe material is less likely to be applied to the inner ring of the bearing.

In the above aspect, the collar members may respectively abut on end surfaces of the inner ring in the axial direction.

According to this aspect, the movement range of the inner ring is limited to a narrower range as compared with the case where the collar member does not abut on the inner ring. Therefore, the connection between the inner ring and the core body becomes stronger.

In the above aspect, the roller may include a cylindrical inner cylinder member (82) coupled to the bearing, and a stepped hole into which the outer ring is fitted may be provided at an end of an inner hole of the inner cylinder member in the axial direction.

According to this aspect, the bearing can be easily assembled to the roller.

An aspect of the disclosure provides a manufacturing method of a wheel (17) which includes an annular core body (36), a plurality of bearings (75) each including an inner ring (76) fixed to the core body and an outer ring (77) relatively rotatable with respect to the inner ring, and a plurality of rollers (37) each fixed to the outer ring to be rotatably supported by the core body via the bearing. The manufacturing method of the wheel includes: a mounting step of mounting the bearings to which the rollers are fixed on a pipe material (81); a positioning step of positioning the bearings; a pressurizing step of fixing the inner ring to the pipe material by injecting a fluid into an inner hole of the pipe material and pressurizing the pipe material; and a molding step of forming the core body from the pipe material to which the inner ring is fixed.

According to this aspect, a plurality of inner rings can be fixed to the pipe material constituting the core body at a time by the deformation of the pipe material due to pressurization. Therefore, for example, since a process of fixing the inner ring to the core body for each roller is not required, it is possible to provide the manufacturing method of the wheel for an omnidirectional moving device which takes fewer man-hours.

In the above aspect, in the mounting step, collar members (80) each having a circular inner hole may be mounted on both sides of the roller of the pipe material in an extending direction of the pipe material, and an inner diameter of the collar member may be smaller than an inner diameter of the inner ring.

According to this aspect, since the inner diameter of the collar member is smaller than the inner diameter of the inner ring, when the pipe material expands and deforms, the inner peripheral surface of the collar member abuts on the pipe material before the inner ring. Accordingly, a load is applied from the collar member to the pipe material to resist the deformation. Therefore, as compared with the case where the collar member is not provided, the load due to the expansion and deformation of the pipe material is less likely to be applied to the inner ring of the bearing.

An aspect of the disclosure provides a manufacturing method of a wheel (17) which includes an annular core body (36), a plurality of bearings (75) each including an inner ring (76) fixed to the core body and an outer ring (77) relatively rotatable with respect to the inner ring, and a plurality of rollers (37) each fixed to the outer ring to be rotatably supported by the core body via the bearing. The manufacturing method of the wheel includes: a mounting step of respectively mounting the bearing to which the roller is fixed and two collar members (80) having an inner diameter smaller than an inner diameter of the inner ring on a pipe material (81) so that the collar members face each other via the bearing; a positioning step of positioning the collar members to be close to the inner ring; a pressurizing step of fixing the collar members to the pipe material by injecting a fluid into an inner hole of the pipe material and pressurizing the pipe material; and a molding step of forming the core body from the pipe material to which the inner ring is fixed.

According to this aspect, a plurality of collar members can be fixed to the pipe material constituting the core body at a time to be close to the inner ring by expanding and deforming the pipe material. Accordingly, a plurality of rollers can be rotatably attached to the core body in a state where the movement along the axial direction of the pipe material is restricted. Therefore, it is possible to provide the manufacturing method of the wheel for an omnidirectional moving device which takes fewer man-hours.

In the above aspect, the positioning step may include a process of positioning the roller by sandwiching the inner ring with the collar members by a jig (90).

According to this aspect, the collar member is fixed to the pipe material in a state of being in contact with the inner ring. Accordingly, the inner ring is prevented from moving by the collar member so that the inner ring can be firmly fixed to the pipe material.

In the above aspect, in the pressurizing step, the collar members may be fixed to the pipe material, and movement of the inner ring in an axial direction of the pipe material may be restricted by the collar members.

According to this aspect, since the movement of the inner ring in the axial direction of the pipe material is restricted by the collar member, the inner ring of the roller can be firmly fixed to the pipe material.

In the above aspect, the roller may include a cylindrical inner cylinder member (82) coupled to the bearing, and a stepped hole (82A) into which the outer ring is fitted may be provided at an end of an inner hole of the inner cylinder member in the axial direction.

According to this aspect, the bearing can be easily assembled to the roller.

In the above aspect, the jig may include a positioning member (92) that presses the collar members respectively toward the inner ring, the positioning member may include a lower member (98) and an upper member (99) coupled to the lower member, at least one of the lower member and the upper member may be provided with a concave portion (98B, 99A) that receives the pipe material, and when the upper member and the lower member are combined, the concave portion may define a through hole (92C) through which the pipe material penetrates in the positioning member.

According to this aspect, the collar members can be respectively pressed toward the inner ring by the positioning member in a state where the pipe material passes through the through hole. Accordingly, the end surface of the collar member can be uniformly pressed in the circumferential direction by the positioning member. Therefore, the collar member can be positioned at a more appropriate position on the core body.

In the above aspect, the pipe material may include an arc portion (81A) that extends along an arc so that the roller and the collar members are mounted, and the jig may include an urging member (93) that urges the positioning member receiving the pipe material toward a center point (0) of the arc.

According to this aspect, the pipe material can be easily fitted into the concave portion.

In the above aspect, in the molding step, the pipe material having a semicircular shape may be joined to form the core body.

According to this aspect, the annular core body can be easily formed.

According to the above configuration, it is possible to provide a wheel for an omnidirectional moving device which takes fewer man-hours for manufacturing, and a manufacturing method of the wheel for an omnidirectional moving device which takes fewer man-hours.

Hereinafter, an embodiment in which a wheel manufactured by a manufacturing method according to the disclosure is provided in an omnidirectional moving device will be described with reference to the drawings. In the following embodiment, the omnidirectional moving device is applied to a cart.

As shown in FIG. 1, the cart 1 includes a vehicle body 2, a pair of omnidirectional moving devices 3 provided on the vehicle body 2 and moving the vehicle body 2 in all directions along a floor surface, a handle 4 provided on the vehicle body 2 and receiving an operation of a user, a force sensor 5 detecting a load applied to the handle 4, and a control device 6 controlling the omnidirectional moving device 3 based on the load detected by the force sensor 5.

A support base 7 for supporting another device is provided at the front part of the vehicle body 2. The device to be supported by the support base 7 includes, for example, an inspection device such as an X-ray scanner. The device may be fastened to the support base 7. The control device 6, a battery, and various sensors may be provided inside the rear part of the vehicle body 2.

Figure 2:
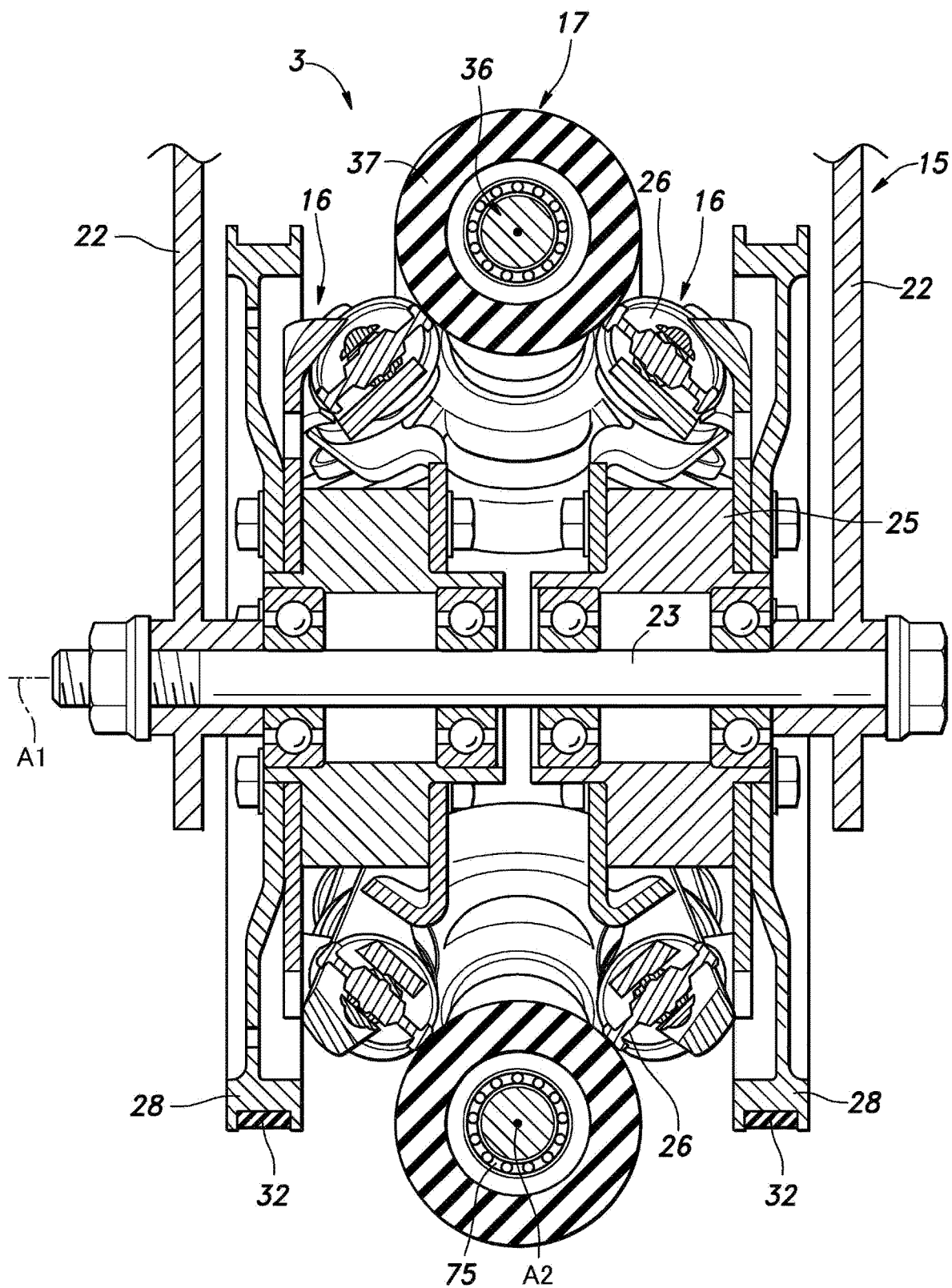
FIG. 2 is a cross-sectional view of the omnidirectional moving device.

The pair of omnidirectional moving devices 3 are provided at the lower part of the rear part of the vehicle body 2. Left and right casters 12 are supported at the lower part of the front part of the vehicle body 2 via a suspension 11. As shown in FIG. 1 and FIG. 2, each omnidirectional moving device 3 includes a frame 15, a pair of drive disks 16 rotatably supported by the frame 15, an annular wheel 17 arranged between the pair of drive disks 16, and a pair of electric motors 18 respectively rotating the drive disks 16. The pair of drive disks 16 transmit a driving force to the wheel 17.

As shown in FIG. 1, the frame 15 includes a frame upper portion 21 coupled to the lower part of the vehicle body 2, and a pair of frame side portions 22 extending downward from the left and right ends of the frame upper portion 21. As shown in FIG. 2, a support shaft 23 extending to the left and right is bridged to the lower ends of the pair of frame side portions 22. The pair of drive disks 16 are rotatably supported by the support shaft 23. The pair of drive disks 16 rotate around the axis of the support shaft 23. The position of each drive disk 16 in the left-right direction with respect to the support shaft 23 is restricted. The drive disks 16 face each other at a distance in the left-right direction.

The drive disks 16 are respectively arranged on both sides of the annular wheel 17, and apply a frictional force to the wheel 17 to rotate the wheel 17 around a central axis A1 and around an annular axis A2. The drive disk 16 includes a disk-shaped base 25 rotatably supported by the frame 15, and a plurality of drive rollers 26 which are rotatably supported by the outer peripheral portion of the base 25 to be inclined to one another and come into contact with the wheel 17. The base 25 is arranged coaxially with the support shaft 23.

Driven pulleys 28 are respectively provided on opposite surfaces of the drive disks 16. The driven pulley 28 is provided coaxially with the drive disk 16. As shown in FIG. 1, the pair of electric motors 18 respectively rotating the drive disks 16 are provided at the lower part of the vehicle body 2. A drive pulley 31 is provided on the drive shaft of each electric motor 18. The drive pulley 31 is connected to the corresponding driven pulley 28 via a belt 32. In the present embodiment, four electric motors 18 are provided corresponding to the four drive disks 16. As the electric motors 18 rotate independently of one another, the drive disks 16 rotate independently of one another.

Figure 3:
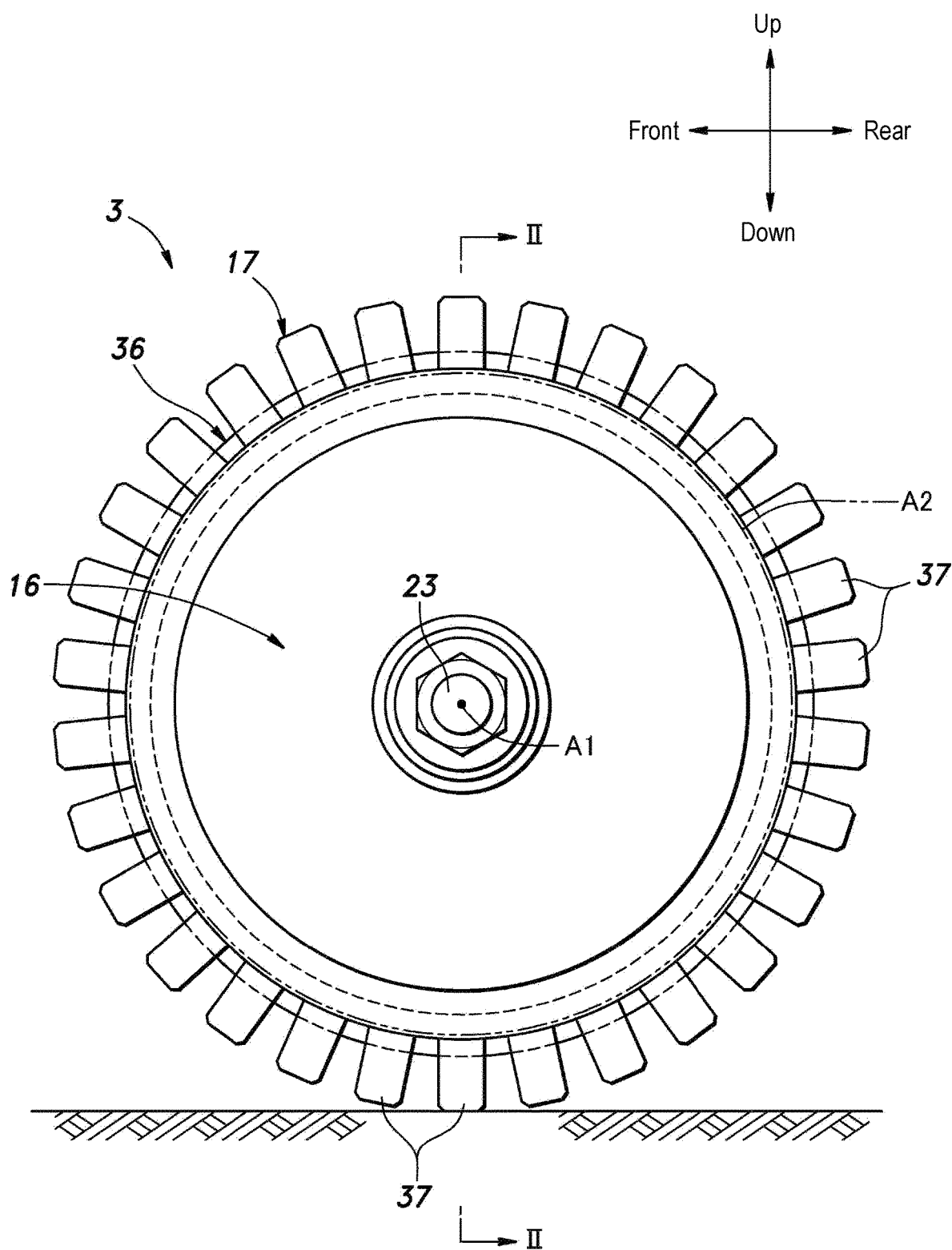
FIG. 3 is a side view of the omnidirectional moving device.

As shown in FIG. 2 and FIG. 3, the wheel 17 forms an annular shape, is arranged coaxially with the drive disks 16 between the pair of drive disks 16, is in contact with the plurality of drive rollers 26, and is rotatable around the central axis A1 and around the annular axis A2.

The wheel 17 includes an annular core body 36 (see FIG. 3 to FIG. 5), a plurality of rollers 37 (also referred to as tires) (see FIG. 3 to FIG. 5) rotatably supported by the core body 36 via bearings 75 (see FIG. 5), and a plurality of collar members 80 (see FIG. 4 and FIG. 5) fixed to the core body 36. In the present embodiment, the wheel 17 includes 22 rollers 37.

Figure 4:
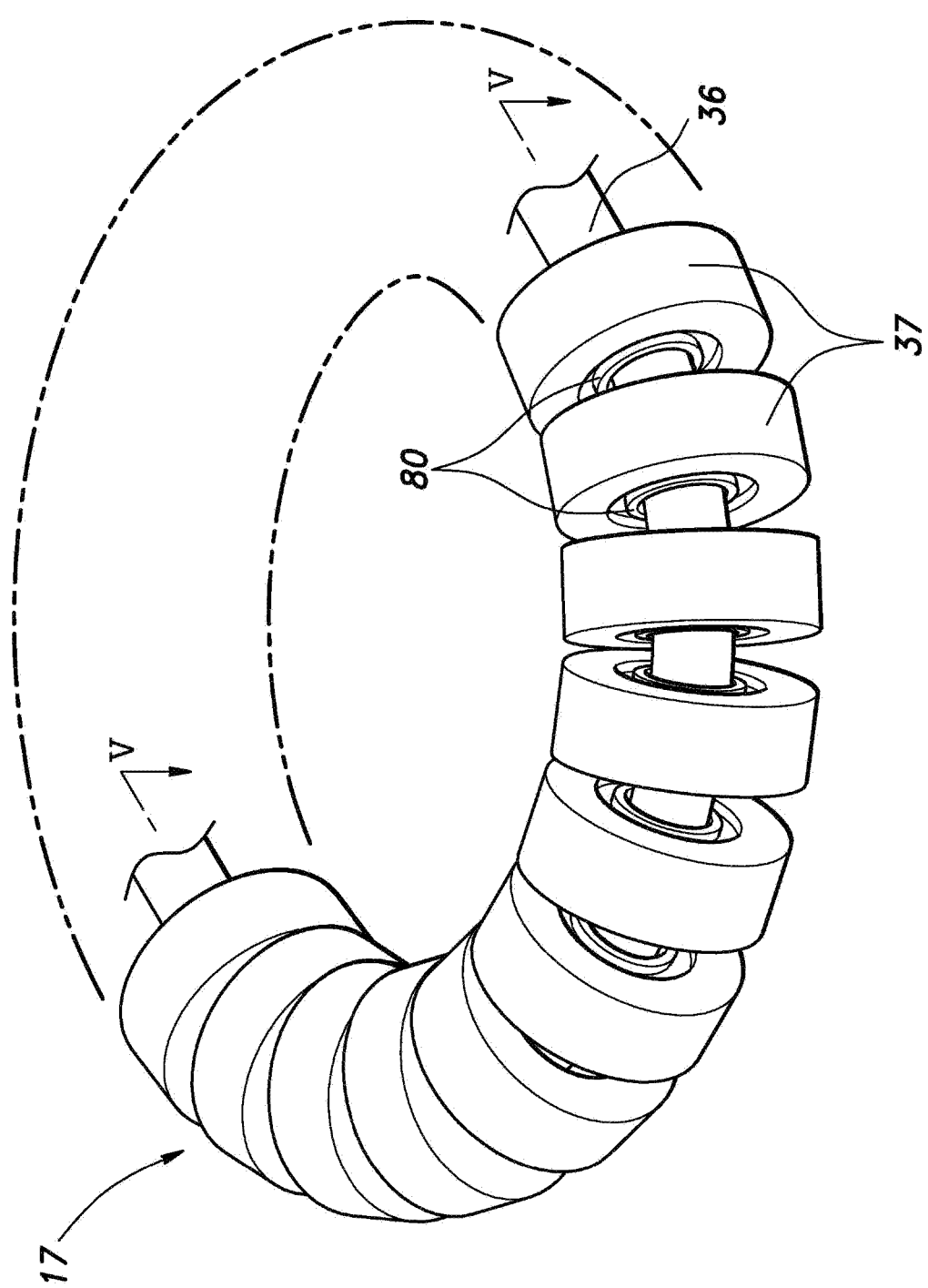
FIG. 4 is a perspective view of the wheel according to an embodiment.
Figure 5:
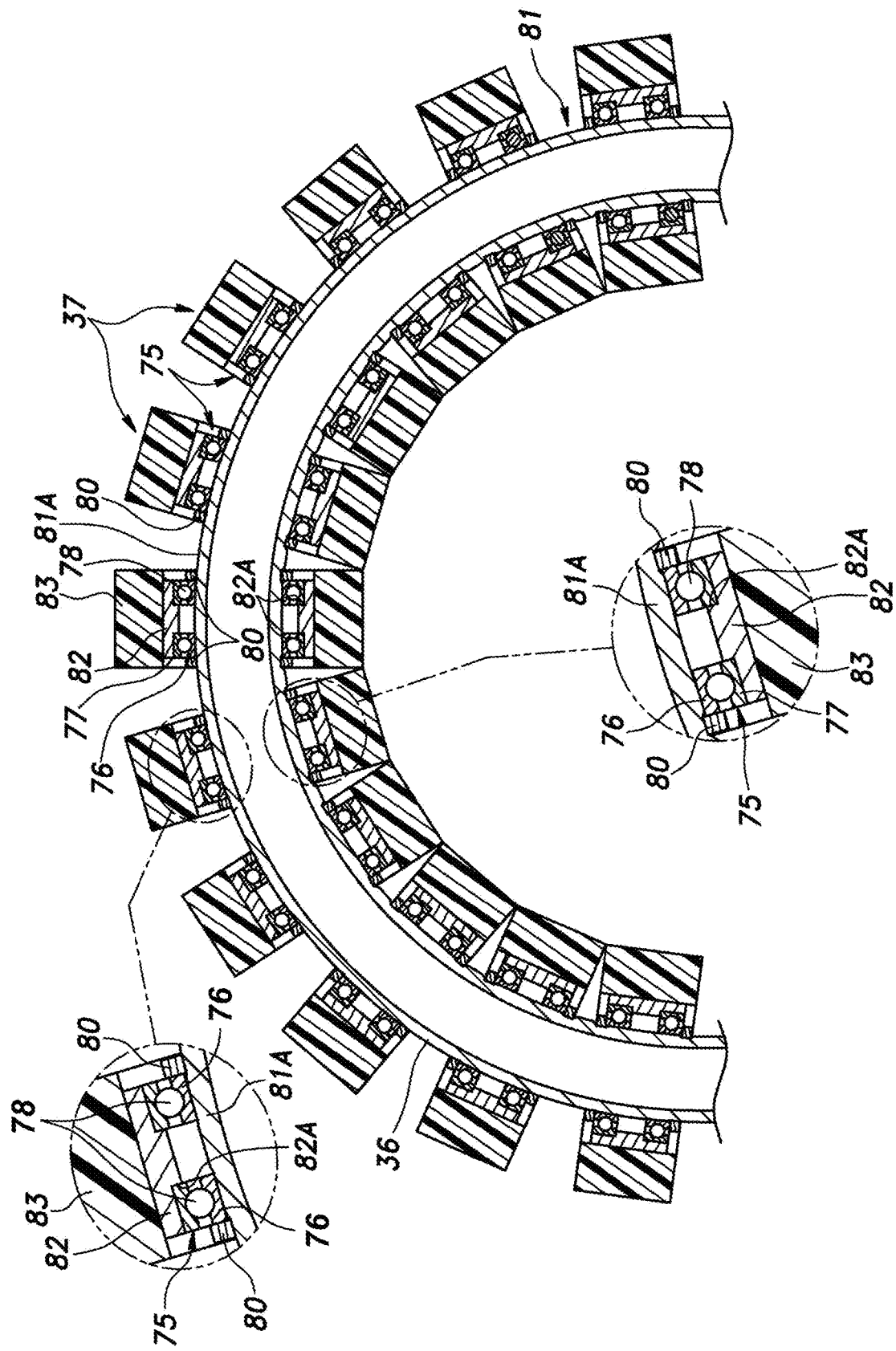
FIG. 5 is a cross-sectional view taken along the line V-V of FIG. 4 and an enlarged view of the portion surrounded by the two-dot chain line.

As shown in FIG. 3 and FIG. 4, the core body 36 is a member made of metal and forms a perfect circular shape in the side view. As shown in FIG. 5, the core body 36 forms a torus shape having an annular cavity inside. In the present embodiment, the core body 36 is configured by joining pipe members 81 (see FIG. 6) which are two cylindrical tubular members bent to form a semicircular shape. However, the disclosure is not limited to this aspect, and the core body 36 may be configured by a cylindrical pipe material 81 which is bent in an annular shape and has both ends connected to each other, or may be configured by joining two or more pipe members 81 which are bent in an arc shape. Further, the core body 36 may have a polygonal shape.

The bearing 75 is a radial bearing that supports a radial load, and is a ball bearing in the present embodiment. As shown in FIG. 5, the bearing 75 includes an inner race 76 (also referred to as an inner ring), an outer race 77 (also referred to as an outer ring), a plurality of balls 78 interposed between the inner race 76 and the outer race 77, and a retainer holding the plurality of balls 78. The inner race 76 and the outer race 77 each have a coaxial straight cylindrical shape.

The roller 37 includes a sleeve 82 (also referred to as a rim) and a rubber ring 83 provided on the outer peripheral surface of the sleeve 82. The sleeve 82 is an inner cylinder member constituting the inner peripheral side of the roller 37, and has a straight cylindrical shape. The sleeve 82 may be formed of metal, and is formed of aluminum in the present embodiment. The rubber ring 83 may be adhered to the sleeve 82 by vulcanization molding or the like.

Stepped holes 82A are provided at both ends of the inner hole of the sleeve 82. The outer race 77 is fitted in each of the stepped holes 82A.

Figure 6:
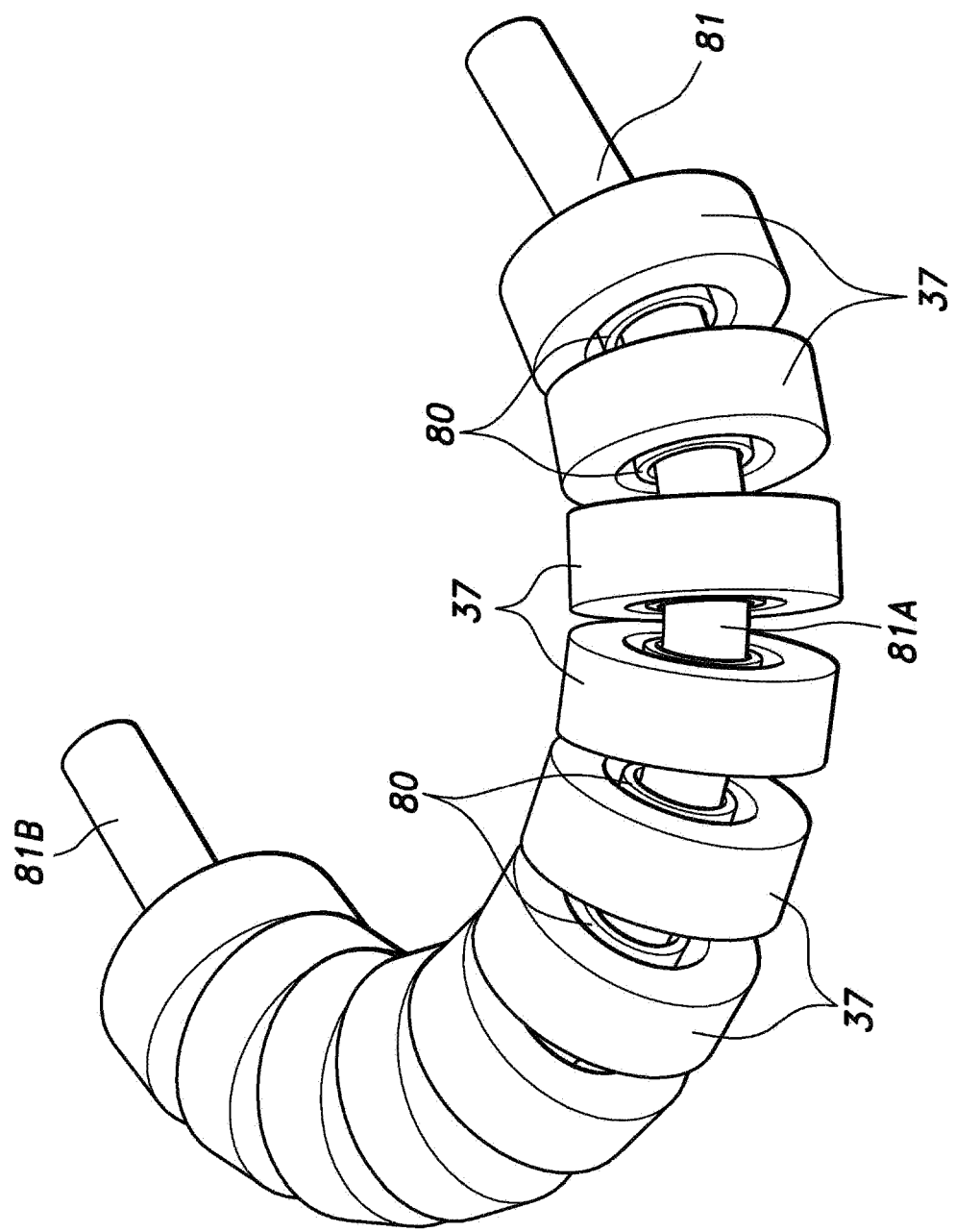
FIG. 6 is a perspective view showing a state when the rollers are mounted on the pipe material before the pressurizing process.

As shown in FIG. 4 and FIG. 6, the collar member 80 is an annular metal member having the same shape. As shown in FIG. 4, the collar member 80 is provided with a circular inner hole. As shown in FIG. 5, the core body 36 is inserted into each of the inner holes of the collar members 80. The inner diameter of the collar member 80 is smaller than the inner diameter of the inner race 76. The collar members 80 are arranged on the outer sides of both ends of the bearing 75 in the axial direction. In the present embodiment, since the wheel 17 includes 22 rollers 37 and the collar members 80 are provided on both sides of all the rollers 37 in the axial direction, the wheel 17 has a total of 44 collar members 80. The collar member 80 is fastened to the core body 36 to be frictionally locked and fixed to the outer peripheral surface of the core body 36. The collar member 80 abuts on the outer peripheral surface of the core body 36 by the inner peripheral surface over the entire circumference in the circumferential direction.

The inner race 76 is also fastened to the core body 36 to be frictionally locked and fixed to the outer peripheral surface of the core body 36. The inner race 76 abuts on the outer peripheral surface of the core body 36 by the inner peripheral surface over the entire circumference in the circumferential direction.

Further, since the collar members 80 are located on the outer sides of both ends of the bearing 75 in the axial direction with respect to the inner race 76, the movement of the bearing 75 along the core body 36 is restricted. In the present embodiment, the collar members 80 respectively abut on the inner race 76 from both sides of the roller 37 in the axial direction. Accordingly, the roller 37 (inner race 76) is immovable in the direction along the core body 36, and is firmly fixed by the outer peripheral surface of the core body 36.

Since the outer race 77 is rotatable around the axis with respect to the inner race 76, the sleeve 82 fixed to the outer race 77 is rotatable with respect to the core body 36. Thus, the roller 37 is rotatably supported by the core body 36 via the bearing 75 around the annular axis A2 (specifically, the tangent of the axis A2) of the core body 36.

As shown in FIG. 3, the plurality of rollers 37 are arranged at equal intervals in the circumferential direction of the core body 36. Each of the rollers 37 can rotate around the tangent of the core body 36 at each position with respect to the core body 36. Each roller 37 receives an external force and rotates with respect to the core body 36.

As shown in FIG. 2 and FIG. 3, the wheel 17 is arranged along the outer peripheral portion of the pair of drive disks 16, and is in contact with the plurality of drive rollers 26 provided on each drive disk 16. The drive rollers 26 of each drive disk 16 come into contact with the inner peripheral portion of the wheel 17 and sandwich the wheel 17 from both the left and right sides. Further, as the drive rollers 26 of the left and right drive disks 16 are in contact with the inner peripheral portion of the wheel 17, the displacement in the radial direction around the axis of the drive disks 16 is restricted. Accordingly, the wheel 17 is supported by the left and right drive disks 16, and the central axis A1 of the wheel 17 (core body 36) is arranged substantially coaxially with the axes of the left and right drive disks 16. The wheel 17 is in contact with the plurality of drive rollers 26 of the left and right drive disks 16 in the plurality of rollers 37.

In each omnidirectional moving device 3, when the pair of drive disks 16 rotate in the same direction at the same rotation speed, the wheel 17 rotates together with the pair of drive disks 16. That is, the wheel 17 rotates forward or rearward around the central axis A1. At this time, the drive rollers 26 of the drive disks 16 and the rollers 37 of the wheel 17 do not rotate with respect to the core body 36. In each omnidirectional moving device 3, when a difference in rotation speed is generated between the pair of drive disks 16, with respect to the force in the circumferential (tangential) direction caused by the rotation of the pair of drive disks 16, a component force in a direction orthogonal to this force acts on the rollers 37 of the wheel 17 from the left and right drive rollers 26. Since the axis of the drive roller 26 is inclined with respect to the plane orthogonal to the axis of the drive disk 16, a component force is generated due to the difference in rotation speed between the drive disks 16. Due to this component force, the drive rollers 26 rotate with respect to the base 25, and the rollers 37 rotate with respect to the core body 36. Accordingly, the wheel 17 generates a driving force in the left-right direction.

The cart 1 moves forward as the left and right omnidirectional moving devices 3 rotate forward at the same speed. The cart 1 moves rearward as the left and right omnidirectional moving devices 3 rotate rearward at the same speed. The cart 1 turns to the right or left due to the speed generated in the rotation of the left and right omnidirectional moving devices 3 in the front-rear direction. The cart 1 moves laterally to the right or left as the rollers 37 of each wheel 17 of the left and right omnidirectional moving devices 3 rotate.

As shown in FIG. 1, the force sensor 5 is provided between the vehicle body 2 and the handle 4. The control device 6 is an electronic control device (ECU) including a processor such as a CPU, a non-volatile memory (ROM), a volatile memory (RAM), etc. The control device 6 controls the electric motor 18 based on the load and the moment detected by the force sensor 5 by executing arithmetic processing according to the program stored in the non-volatile memory in the processor. Accordingly, when the occupant applies a load and a moment to the handle 4, the omnidirectional moving device 3 is driven and the cart 1 travels.

Next, a manufacturing method of the wheel 17 will be described. The manufacturing method includes, in order, a preparation process, a mounting process (mounting step), a positioning process (positioning step), a pressurizing process (pressurizing step), and a molding process (molding step).

In the preparation process, the operator prepares a pipe material 81 molded in advance to have a semicircular portion in a part as shown in FIG. 6. Hereinafter, the semicircular portion of the pipe material 81 will be referred to as an arc portion 81A if necessary. Straight portions 81B extending linearly are respectively connected to both ends of the arc portion 81A.

The operator further fits and fixes the outer race 77 of the bearing 75 into the stepped hole 82A of the sleeve 82 (see FIG. 5). Accordingly, the roller 37 is fixed to the bearing 75. As described above, the inner diameter of the sleeve 82 is greater than the outer diameter of the bearing 75 (outer race 77), and the sleeve 82 is provided with the stepped hole 82A. Therefore, by fitting the outer race 77 of the bearing 75, the bearing 75 can be easily assembled to the sleeve 82. When the assembly of a predetermined number of bearings 75 to the sleeves 82 is completed, the operator performs the mounting process.

In the mounting process, the operator inserts the pipe material 81 into the inner hole of the collar member 80 and further inserts the pipe material 81 into the inner hole of the inner race 76, and then inserts the pipe material 81 into the inner hole of the collar member 80. Accordingly, the collar member 80, the bearing 75 and the roller 37, and the collar member 80 are mounted on the pipe material 81 in the order described (see FIG. 6). Further, the collar members 80 are arranged on both sides of the roller 37 in the extending direction of the pipe material 81.

Furthermore, the operator repeats the process of inserting the pipe material 81 into the inner holes of the collar member 80, the inner race 76, and the collar member 80 in this order a predetermined number of times (11 times in the present embodiment). Thereafter, as shown in FIG. 6, the collar members 80 and the rollers 37 are moved to the arc portion 81A. When the movement is completed, the operator performs the positioning process.

Figure 7:
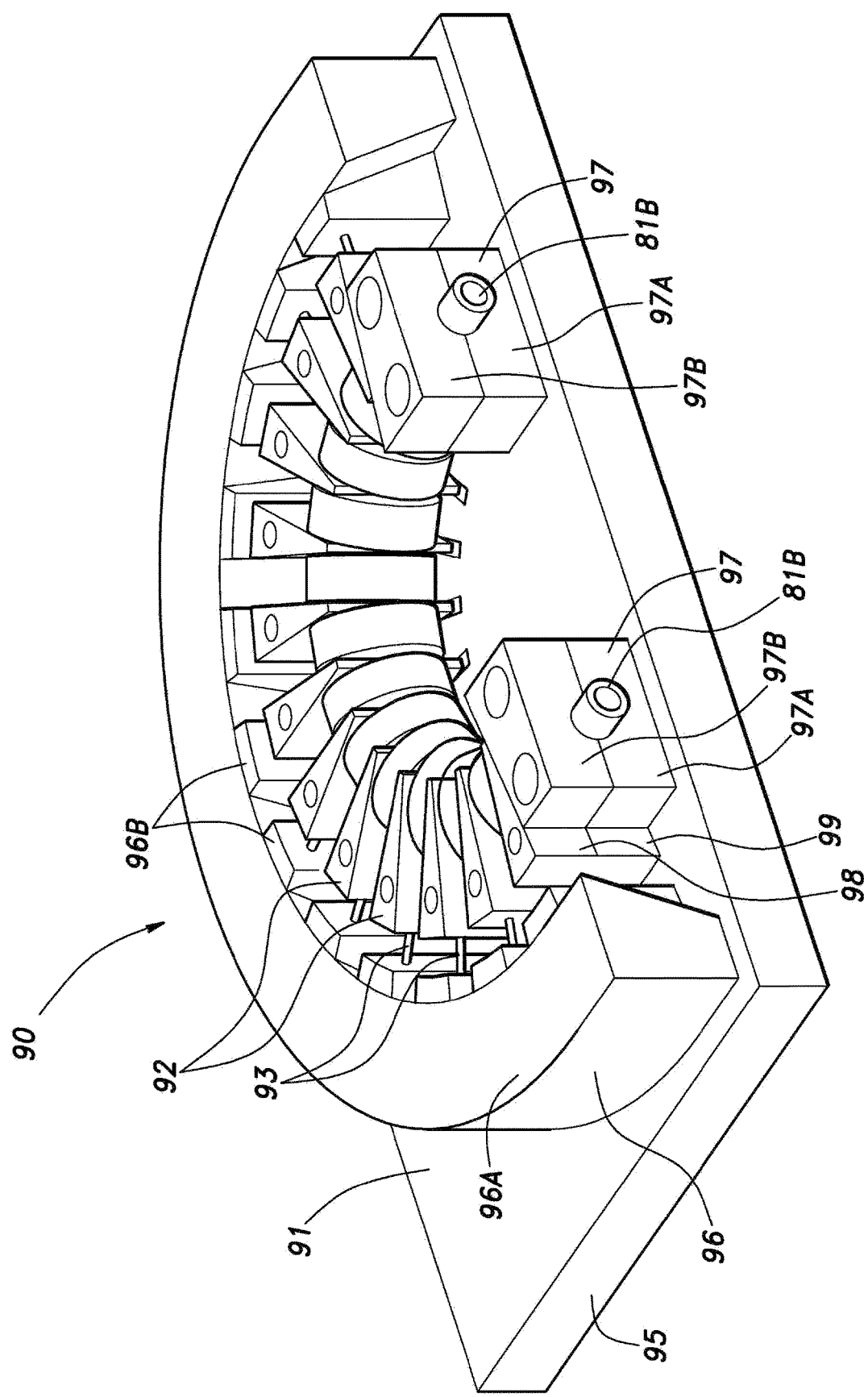
FIG. 7 is a perspective view for illustrating a state when the pipe material is mounted on the jig in the pressurizing process.
Figure 8:
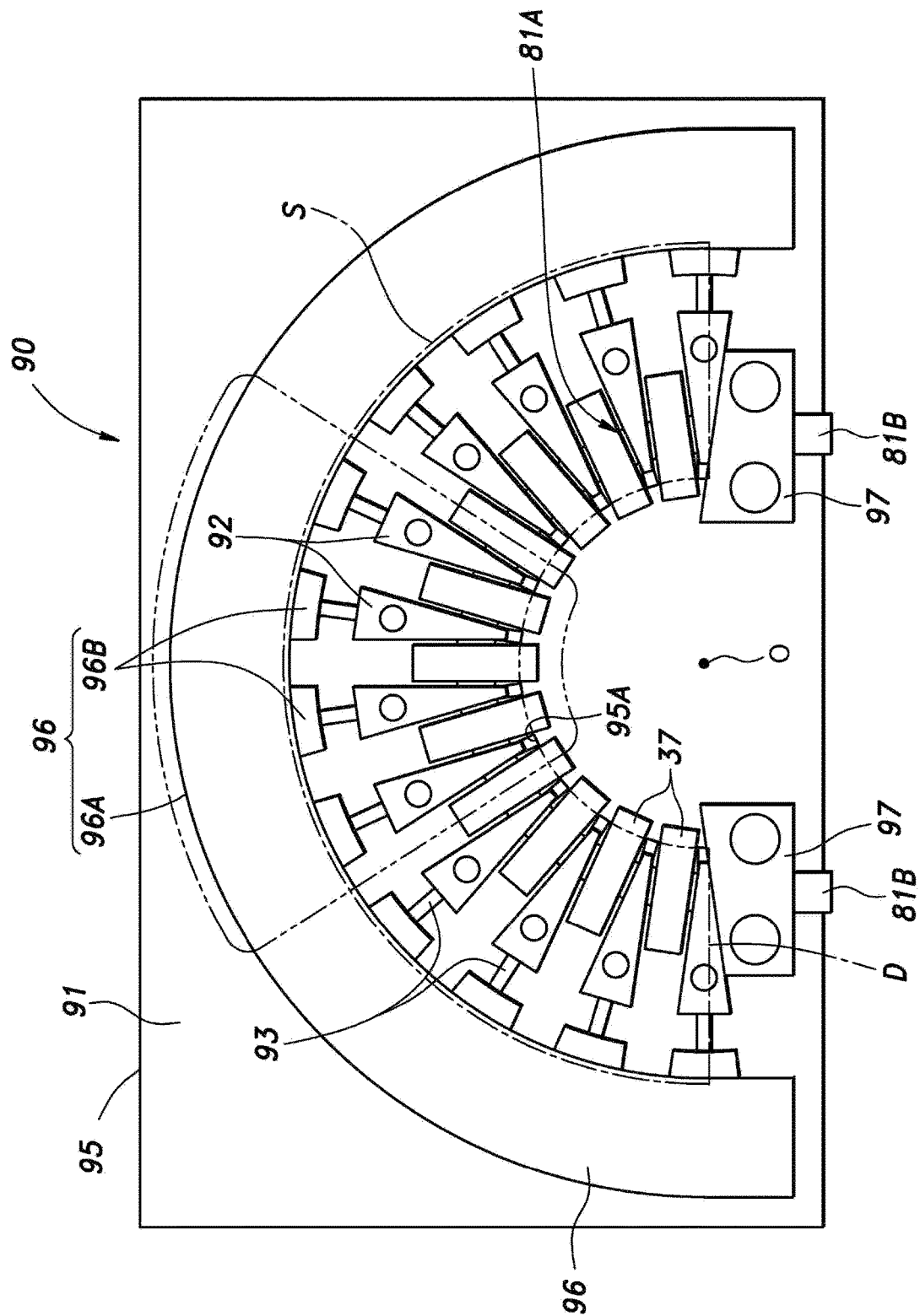
FIG. 8 is a top view for illustrating a state when the pipe material is mounted on the jig in the pressurizing process.

In the positioning process, the operator mounts the pipe material 81 on which a plurality of collar members 80 and a plurality of rollers 37 are mounted on a jig 90 as shown in FIG. 7 and FIG. 8. As shown in FIG. 7, the jig 90 includes a base 91, a plurality of positioning members 92, and a plurality of urging members 93.

The base 91 includes a base portion 95, a support portion 96, and two pipe fixing portions 97.

Figure 9:
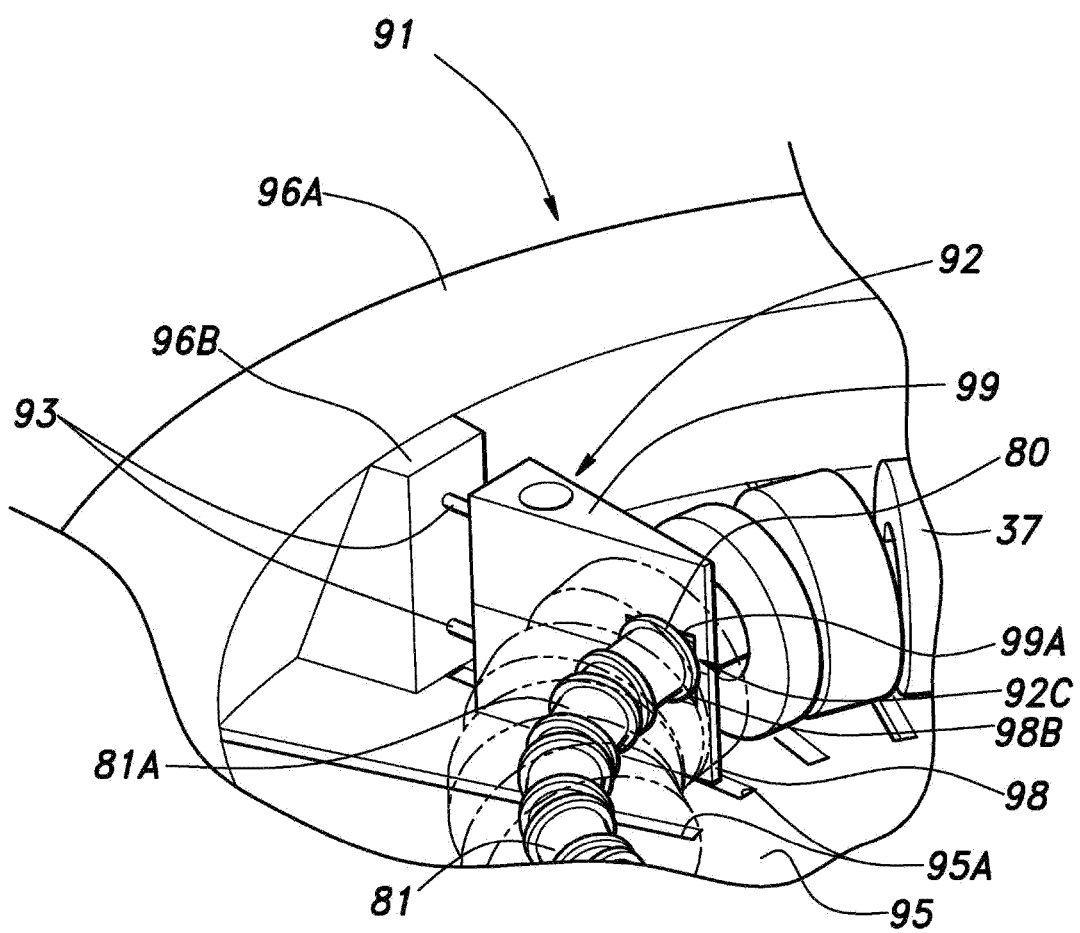
FIG. 9 is a perspective view for illustrating the relationship between the positioning member and the collar member when the pipe material is mounted on the jig in the pressurizing process.

As shown in FIG. 8 and FIG. 9, the base portion 95 is a substantially flat plate-shaped member, and is arranged to form a horizontal surface. A plurality of grooves 95A recessed downward are formed on the upper surface of the base portion 95. The grooves 95A are recessed downward and extend radially around a predetermined point O. A plurality of grooves 95A are provided in a fan-shaped region S centered on the predetermined point O. The angles formed by the adjacent grooves 95A are equal to one another.

The support portion 96 includes an outer extending portion 96A and a plurality of inner holding portions 96B. The outer extending portion 96A is configured by a plate-shaped member fixed to the upper surface of the base portion 95. The outer extending portion 96A is located outside the grooves 95A when viewed from the point O, and has an arc shape centered on the point O. The outer extending portion 96A may be fixed to the base portion 95 with bolts or the like. As shown in FIG. 9, the side surface of the outer extending portion 96A in the vicinity of the point O is inclined in a direction away from the point O downward.

As shown in FIG. 7 and FIG. 8, the inner holding portion 96B is a substantially rectangular parallelepiped member, and is respectively arranged outside the groove 95A when viewed from the point O. Each of the inner holding portions 96B is arranged to have a surface orthogonal to the upper surface of the base portion 95 and facing the point O. As shown in FIG. 9, the surface of the inner holding portion 96B on the side away from the point O is inclined in a direction away from the point O downward and abuts on the outer extending portion 96A.

As shown in FIG. 8, each of the pipe fixing portions 97 is located outside the semicircular region S (see the one-dot chain line in FIG. 8) and is arranged to be close to the straight part D thereof. As shown in FIG. 7, the pipe fixing portion 97 includes a fixing portion lower portion 97A and a fixing portion upper portion 97B. The fixing portion lower portion 97A constitutes the lower half portion of the pipe fixing portion 97 and is fixed to the upper surface of the base portion 95. The fixing portion upper portion 97B constitutes the upper half portion of the pipe fixing portion 97. The pipe material 81 is sandwiched between the fixing portion upper portion 97B and the fixing portion lower portion 97A to be fixed to the base 91.

Figure 10:
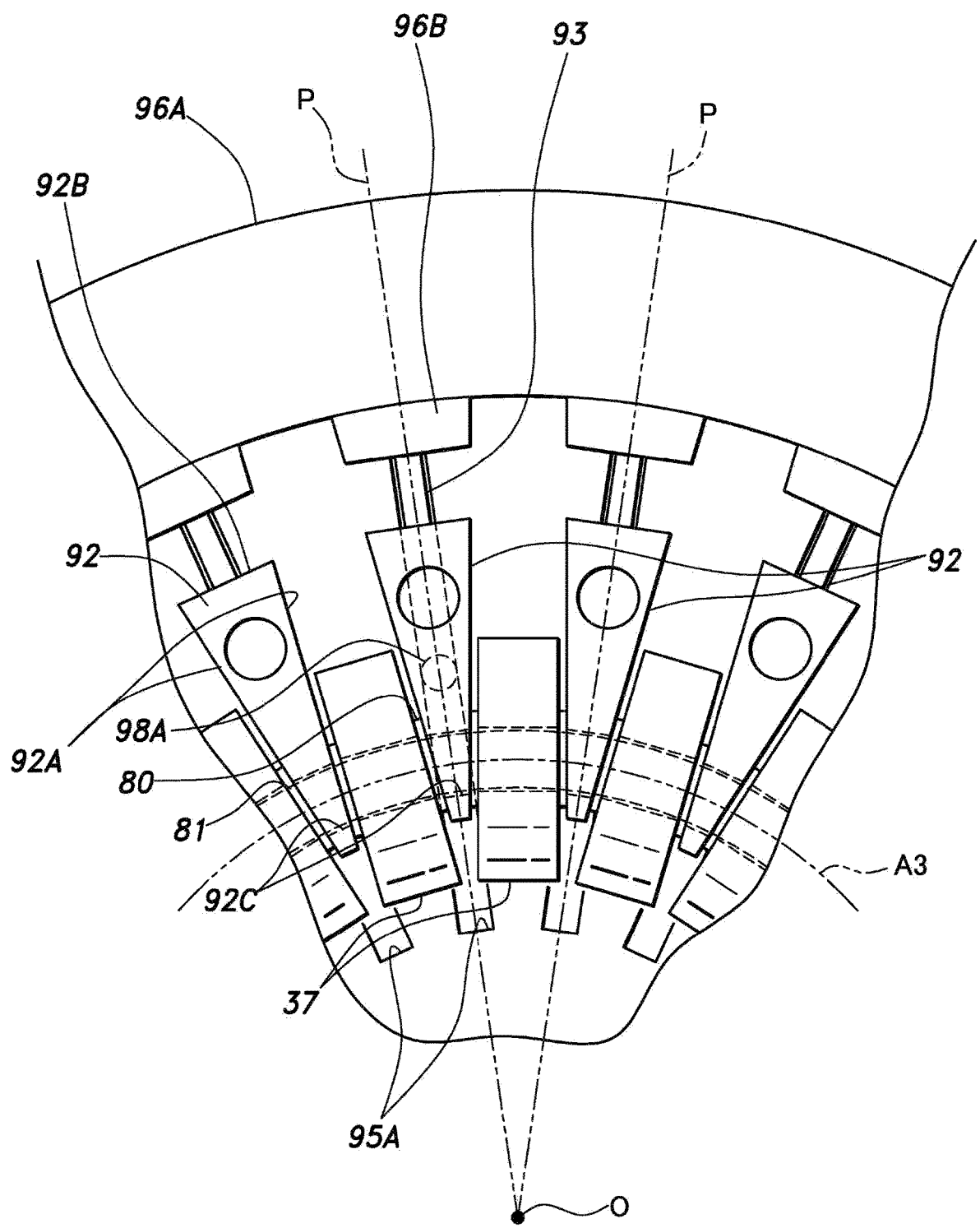
FIG. 10 is an enlarged view corresponding to the portion surrounded by the two-dot chain line of FIG. 8.

FIG. 10 shows an enlarged view of the portion surrounded by the two-dot chain line of FIG. 8. As shown in FIG. 10, each of the positioning members 92 has a triangular shape (wedge shape) having a width that increases away from the point O in the top view. The positioning member 92 has left and right side surfaces 92A that are symmetrical with respect to a plane P extending in a direction away from the point O, and a rear surface 92B orthogonal to the axis.

As shown in FIG. 9, the positioning member 92 includes a lower member 98 constituting the lower half portion thereof and an upper member 99 constituting the upper half portion thereof.

Both the lower member 98 and the upper member 99 form a triangular shape (wedge shape) having a width that increases away from the point O. The lower member 98 and the upper member 99 have substantially the same shape.

As shown in FIG. 10, the lower member 98 includes a protrusion 98A provided on the lower surface thereof and a lower concave portion 98B provided on the upper surface thereof.

The protrusion 98A enters the groove 95A of the base portion 95 and cooperates with the groove 95A to limit the movement range of the lower member 98 in the extending direction of the groove 95A along the upper surface of the base portion 95. Because of the cooperation between the protrusion 98A and the groove 95A, the lower member 98 can slide and move along the groove 95A.

As shown in FIG. 9, the lower concave portion 98B is a concave portion recessed downward on the upper surface of the lower member 98. The lower concave portion 98B extends linearly in a direction orthogonal to the plane P (see FIG. 10) radially extending from the point O in the top view, and both ends reach the edge of the upper surface of the lower member 98, respectively.

The upper member 99 includes an upper concave portion 99A provided on the lower surface. The upper concave portion 99A is a concave portion recessed upward on the lower surface of the upper member 99. The upper concave portion 99A extends linearly in a direction orthogonal to the plane P (see FIG. 10) radially extending from the point O in the top view, and both ends reach the edge of the upper surface of the upper member 99, respectively.

The upper member 99 and the lower member 98 are vertically laminated with the upper surface and the lower surface thereof being in contact with each other, and are fastened with bolts to form the positioning member 92. Since the lower member 98 can slide and move along the groove 95A, the positioning member 92 can also slide and move along the groove 95A.

When the upper member 99 and the lower member 98 are fastened, the upper concave portion 99A and the lower concave portion 98B vertically overlap each other to form an insertion hole 92C which is a hole (through hole) penetrating the positioning member 92. The insertion hole 92C is open on both the left and right side surfaces 92A of the positioning member 92. The insertion hole 92C is set to a size that allows the pipe material 81 to be inserted. In the present embodiment, as shown in FIG. 9, the cross section of the insertion hole 92C has a square shape. The length of one side of the cross section of the insertion hole 92C is smaller than the outer diameter of the collar member 80. However, the cross section of the insertion hole 92C is not limited to a square shape, and any aspect may be used as long as the pipe material 81 can be inserted and the collar member 80 cannot be inserted.

The urging member 93 is configured by a coil spring. The urging member 93 is located between the support portion 96 and the positioning member 92, and is arranged along the extending direction of the groove 95A in the top view. In the present embodiment, the urging member 93 is respectively provided between the inner holding portion 96B and the upper member 99 and between the inner holding portion 96B and the lower member 98. As shown in FIG. 10, the urging member 93 urges the positioning member 92 (upper member 99 and lower member 98 in the present embodiment) with respect to the support portion 96 toward the point O, and urges the inner holding portion 96B with respect to the positioning member 92 in a direction away from the point O.

As shown in FIG. 9, when the inner holding portion 96B is urged by the urging member 93 in a direction away from the point O, the inner holding portion 96B is guided to move downward by the slope of the outer extending portion 96A on the side of the point O. Accordingly, the inner holding portion 96B is pressed against the upper surface of the base portion 95, and the inner holding portion 96B is fixed to the base portion 95.

When mounting the pipe material 81 on the jig 90, the operator first removes the upper member 99 from the lower member 98. Then, the operator appropriately pushes the lower member 98 in a direction away from the point O, and accommodates the arc portion 81A in the lower concave portion 98B. However, the operator pays attention so that the roller 37 and the two collar members 80 respectively located on both sides of the roller 37 in the axial direction are located between the adjacent lower members 98, and accommodates the arc portion 81A in the lower concave portion 98B.

As shown in FIG. 10, when the accommodation of the pipe material 81 in the lower concave portion 98B is completed, the lower member 98 is urged toward the point O by the urging member 93 and the collar members 80 are respectively pressed against the ends of the inner race 76 of the bearing 75 in the axial direction to position the bearing 75, the roller 37, and the collar members 80. At this time, the center point of the axis of the arc portion 81A of the pipe material 81 is at a position overlapping the point O in the top view. At this time, the insertion hole 92C extends linearly in the tangential direction of the circle A3 centered on the point O in the top view, and the pipe member 81 is arranged with the axis thereof being along the circle A3.

Thereafter, the operator further fastens the upper member 99 to the lower member 98 so that the collar members 80 are more strongly pressed against the bearing 75. Accordingly, the bearing 75, the roller 37, and the collar members 80 are more firmly fixed to the pipe material 81. When the fastening of the upper member 99 is completed, the operator fixes the straight portions 81B by the pipe fixing portions 97, respectively. Then, the operator performs the pressurizing process.

In the pressurizing process, the operator seals one straight portion 81B fixed to the jig 90, and injects and pressurizes a fluid into the inner hole of the end of the other straight portion 81B to expand and deform (hydraulically mold) the pipe material 81. At this time, the pipe material 81 is deformed (that is, expanded) so that the inner diameter becomes larger due to the hydraulic pressure. By expanding the pipe material 81, the outer peripheral surface of the pipe material 81 first abuts on the inner peripheral surface of the collar member 80. Further, when pressure is applied, the outer peripheral surface of the pipe material 81 abuts on the inner peripheral surface of the inner race 76 (see the enlarged view of FIG. 5). Accordingly, the collar member 80 and the inner race 76 are respectively tightened and fitted to the pipe material 81, and are fixed to the pipe material 81 in a frictionally locked state.

In the present embodiment, oil which is a liquid is used as the fluid for pressurization. However, the disclosure is not limited to this aspect, and any fluid including a liquid and gas may be used as long as the fluid can be injected into the inner hole of the pipe material 81 and pressurized to expand and deform the pipe material 81.

For example, the operator maintains the internal pressure of the pipe material 81 at a predetermined value or more for a predetermined time, and then discharges the fluid from the inner hole of the pipe material 81. When the discharge is completed, the operator prepares a newly molded pipe material 81, and performs the mounting process, the positioning process, and the pressurizing process again. When the preparation of two pipe materials 81 that have finished the pressurizing process is completed, the operator performs the molding process.

In the molding process, the operator cuts the straight portion 81B from each of the pipe materials 81 to form two semicircular pipe materials 81. Then, the ends of the semicircular pipe members 81 are butted against each other and joined by welding. Accordingly, a perfect circular core body 36 is formed and the wheel 17 is completed. As described above, since the perfect circular core body 36 can be formed by joining the two semicircular pipe members 81, the wheel 17 can be easily manufactured. At this time, the roller 37 functions as a free roller that is rotatably supported by the core body 36 via the bearing 75.

Next, the effects of the manufacturing method of the wheel 17 configured as described above and the wheel 17 will be described.

By expanding and deforming (hydraulically molding) the pipe material 81 in the pressurizing process, a plurality of inner races 76 can be fixed to the pipe material 81 at a time. Therefore, a process of fixing the inner race 76 to the pipe material 81 for each roller 37 is not required. Thus, the man-hours can be reduced as compared with the case where the inner race 76 is fixed to the pipe material 81 for each roller 37, so the manufacturing cost of the wheel 17 can be suppressed.

Since the inner diameter of the collar member 80 is smaller than the inner diameter of the inner race 76, when the pipe material 81 is expanded, the inner peripheral surface of the collar member 80 abuts on the pipe material 81 before the inner race 76. Therefore, a load is applied from the collar member 80 to the pipe material 81 to resist the expansion of the diameter. Further, even after the pipe material 81 abuts on the inner race 76, a load is applied from the collar member 80 to the pipe material 81 to resist the expansion of the diameter. Thus, the load is distributed as compared with the case where the collar member 80 is not provided, and the load due to the expansion is less likely to be applied to the inner race 76. Thus, it is possible to prevent an excessive load due to the expansion from being applied to the bearing 75, and it is possible to improve the durability of the bearing 75.

By sandwiching the inner race 76 with the collar members 80 by the jig 90, the pressurizing process is performed after the inner race 76 is positioned. In the pressurizing process, the pipe material 81 is expanded, and the collar member 80 and the inner race 76 are fixed to the pipe material 81 in a state where the inner race 76 is sandwiched by the collar members 80.

Since the inner race 76 is fixed to the pipe material 81 in a state where the inner race 76 is sandwiched by the collar members 80, the movement of the inner race 76 in the direction along the pipe material 81 is restricted. Thus, the inner race 76 can be more firmly fixed to the pipe material 81 as compared with the case where the collar member 80 is not provided.

The insertion hole 92C is formed in the positioning member 92 by the upper concave portion 99A of the upper member 99 and the lower concave portion 98B of the lower member 98. As shown in FIG. 9 and FIG. 10, the collar member 80 is positioned by the positioning member 92 in a state where the pipe member 81 is inserted into the insertion hole 92C of the positioning member 92.

In this way, the positioning member 92 presses the collar member 80 attached to the pipe material 81 in a state where the pipe material 81 penetrates the positioning member 92. Therefore, a load can be applied to both end surfaces of the collar members 80 in the axial direction over the entire circumference. Accordingly, the end surface of the collar member 80 is uniformly pressed by the positioning member 92 in the circumferential direction, and the collar member 80 and the inner race 76 are positioned at appropriate positions.

Each of the positioning members 92 can slide in the extending direction of the groove, and is urged toward the point O by the urging member 93. Therefore, when the pipe material 81 is expanded in the pressurizing process, the positioning member 92 slides while pressing the collar member 80 toward the inner race 76. Thus, it is possible to prevent an excessive load from being applied to the pipe material 81 while positioning the collar member 80 and the inner race 76. Further, since the urging member 93 urges the positioning member 92 toward the point O, the pipe material 81 can be prevented from expanding and deforming in a direction away from the point O due to the hydraulic pressure.

In addition, when the pipe material 81 is assembled to the jig 90, the lower member 98 can be slid and moved against the urging force from the urging member 93. Thus, even if the pipe material 81 is slightly distorted, the pipe material 81 can be easily fitted into the lower concave portion 98B by moving the lower member 98.

Although the description of the specific embodiments is completed above, the disclosure can be widely modified without being limited to the above embodiments.

In the above embodiment, the insertion hole 92C is configured to extend linearly, but the disclosure is not limited to this aspect. The insertion hole 92C may be configured to form an arc along the circumferential direction of the circle A3 centered on the point O.

In the above embodiment, the jig 90 may further include a lid that is fixed to a substrate and abuts on the upper surface of the positioning member 92 in addition to the base 91, the plurality of positioning members 92, and the plurality of urging members 93. When the urging member 93 is pressed by the hydraulic pressure and then the hydraulic pressure is lowered, the inner holding portion 96B can be prevented from moving upward due to the urging force of the urging member 93.

In the above embodiment, the pipe material 81 is expanded and deformed, and the collar member 80 and the inner race 76 are both tightened and fitted to the pipe material 81, but the collar member 80 may not be provided, and the inner race 76 may be directly tightened and fitted to the pipe material 81 to be frictionally locked and fixed to the pipe material 81.

Further, only the collar member 80 may be tightened and fitted in a state where the gap between the inner race 76 and the pipe material 81 is sufficiently small. At this time, the collar members 80 may be pressed against the inner race 76 by the positioning members 92 to sandwich the inner race 76, and after the roller 37 is positioned, the pressurizing process may be performed so that the collar members 80 are tightened and fitted while abutting on the inner race 76 from both ends of the roller 37 in the axial direction. Accordingly, the movement of the inner race 76 in the direction along the pipe material 81 is restricted so that the inner race 76 can be more firmly fixed to the pipe material 81.

In addition, in the above embodiment, since the inner race 76 and the collar member 80 are respectively tightened and fitted to the pipe material 81, the pipe material 81 is expanded by hydraulic pressure, but the disclosure is not limited to this aspect, and expansion/contraction due to a temperature change may be used. Specifically, the pipe material 81 having an outer diameter slightly smaller than the inner diameter of the collar member 80 is cooled, and then inserted into the inner race 76 and the collar member 80. Thereafter, the pipe material 81 may be returned to the room temperature to be expanded and deformed so as to tighten and fit the inner race 76 and the collar member 80 respectively to the pipe material 81. Furthermore, when the tightening is performed using expansion/contraction due to a temperature change, the core body 36 may be made of a solid material.

Further, in the above embodiment, the upper member 99 and the lower member 98 of the positioning member 92 are respectively provided with the upper concave portion 99A and the lower concave portion 98B, but the disclosure is not limited to this aspect. A concave portion may be provided only on either the lower surface of the upper member 99 or the upper surface of the lower member 98 to form the insertion hole 92C in the positioning member 92.

In addition, in the above embodiment, the core body 36 is formed by connecting the pipe members 81 formed in a semicircular shape, but the disclosure is not limited to this aspect. The core body 36 may be formed by forming the pipe material 81 in a substantially annular shape, fixing the inner race 76, and then connecting both ends of the pipe material 81.

In the above embodiment, the roller 37 is rotatably supported by the core body 36 via two bearings 75, but the disclosure is not intended to limit the number of bearings 75 interposed between the roller 37 and the core body 36. The number of bearings 75 interposed between the roller 37 and the core body 36 may be one, or may be three or more.

What is claimed is:

1. A wheel, comprising:
an annular core body;
a plurality of bearings each comprising an inner ring and an outer ring relatively rotatable with respect to at least one of the plurality of the inner rings, wherein at least one of the plurality of the inner rings is fixed to an outer peripheral surface of the core body; and
a plurality of rollers each fixed to at least one of the plurality of the outer rings and rotatably supported by the core body through at least one of the plurality of the bearings,
wherein at least one of the plurality of the inner rings is fitted to the core body,
wherein at least one of the plurality of the inner rings abuts on the core body.

2. A wheel, comprising:
an annular core body;
a plurality of bearings each comprising an inner ring and an outer ring relatively rotatable with respect to at least one of the plurality of the inner rings, wherein at least one of the plurality of the inner rings is fixed to an outer peripheral surface of the core body;
a plurality of rollers each fixed to at least one of the plurality of the outer rings and rotatably supported by the core body through at least one of the plurality of the bearings; and
collar members fixed to the core body on both sides of at least one of the plurality of the inner rings in an axial direction of at least one of the plurality of the rollers and having a circular inner hole smaller than an inner diameter of at least one of the plurality of the inner rings,
wherein the collar members are fitted to the core body,
wherein at least one of the plurality of the inner rings abuts on the core body.

3. The wheel according to claim 2, wherein the collar members respectively abut on end surfaces of at least one of the plurality of the inner rings in the axial direction.

4. The wheel according to claim 2, wherein at least one of the plurality of the rollers comprises a cylindrical inner cylinder member coupled to at least one of the plurality of the bearings, and
a stepped hole into which at least one of the plurality of the outer rings is fitted is provided at an end of an inner hole of the inner cylinder member in the axial direction.

5. The wheel according to claim 3, wherein at least one of the plurality of the rollers comprises a cylindrical inner cylinder member coupled to at least one of the plurality of the bearings, and
a stepped hole into which at least one of the plurality of the outer rings is fitted is provided at an end of an inner hole of the inner cylinder member in the axial direction.

6. A manufacturing method of a wheel which comprises an annular core body, a plurality of bearings each comprising an inner ring fixed to the core body and an outer ring relatively rotatable with respect to at least one of the plurality of the inner rings, and a plurality of rollers each fixed to at least one of the plurality of the outer rings to be rotatably supported by the core body through at least one of the plurality of the bearings, the manufacturing method of the wheel comprising:
a mounting step of mounting the plurality of the bearings to which the plurality of the rollers are fixed on a pipe material;
a positioning step of positioning the the plurality of bearings;
a pressurizing step of fixing at least one of the plurality of the inner rings to the pipe material by injecting a fluid into an inner hole of the pipe material and pressurizing the pipe material; and
a molding step of forming the core body from the pipe material to which at least one of the plurality of the inner rings is fixed.

7. The manufacturing method of the wheel according to claim 6, wherein in the mounting step, collar members each having a circular inner hole are mounted on both sides of at least one of the plurality of the rollers in an extending direction of the pipe material, and
an inner diameter of the collar member is smaller than an inner diameter of at least one of the plurality of the inner rings.

8. The manufacturing method of the wheel according to claim 7, wherein the positioning step comprises a process of positioning at least one of the plurality of the rollers by sandwiching at least one of the plurality of the inner rings with the collar members by a jig.

9. The manufacturing method of the wheel according to claim 8, wherein in the pressurizing step, the collar members are fixed to the pipe material, and movement of at least one of the plurality of the inner rings in an axial direction of the pipe material is restricted by the collar members.

10. The manufacturing method of the wheel according to claim 8, wherein at least one of the plurality of the rollers comprises a cylindrical inner cylinder member coupled to at least one of the plurality of the bearings, and
a stepped hole into which at least one of the plurality of the outer rings is fitted is provided at an end of an inner hole of the inner cylinder member in the axial direction.

11. The manufacturing method of the wheel according to claim 8, wherein the jig comprises a positioning member that presses the collar members respectively toward at least one of the plurality of the inner rings,
the positioning member comprises a lower member and an upper member coupled to the lower member,
at least one of the lower member and the upper member is provided with a concave portion that receives the pipe material, and
when the upper member and the lower member are combined, the concave portion defines a through hole through which the pipe material penetrates in the positioning member.

12. The manufacturing method of the wheel according to claim 11, wherein the pipe material comprises an arc portion on which at least one of the plurality of the rollers and the collar members are mounted, and
the jig comprises an urging member that urges the positioning member receiving the pipe material toward a center point of the arc portion.

13. The manufacturing method of the wheel according to claim 6, wherein in the molding step, the pipe material having a semicircular shape and another pipe material having a semicircular shape are joined to form the core body.

14. A manufacturing method of a wheel which comprises an annular core body, a plurality of bearings each comprising an inner ring fixed to the core body and an outer ring relatively rotatable with respect to at least one of the plurality of the inner rings, and a plurality of rollers each fixed to at least one of the plurality of the outer rings to be rotatably supported by the core body through at least one of the plurality of the bearings, the manufacturing method of the wheel comprising:

a mounting step of respectively mounting at least one of the plurality of the bearings to which at least one of the plurality of the rollers is fixed and two collar members having an inner diameter smaller than an inner diameter of at least one of the plurality of the inner rings on a pipe material so that the collar members face each other through at least one of the plurality of the bearings;

a positioning step of positioning the collar members to be close to at least one of the plurality of the inner rings;

a pressurizing step of fixing the collar members to the pipe material by injecting a fluid into an inner hole of the pipe material and pressurizing the pipe material; and a molding step of forming the core body from the pipe material to which at least one of the plurality of the inner rings is fixed.

15. The manufacturing method of the wheel according to claim 14, wherein the positioning step comprises a process of positioning at least one of the plurality of the rollers by sandwiching at least one of the plurality of the inner rings with the collar members by a jig.

16. The manufacturing method of the wheel according to claim 15, wherein in the pressurizing step, the collar members are fixed to the pipe material, and movement of at least one of the plurality of the inner rings in an axial direction of the pipe material is restricted by the collar members.

17. The manufacturing method of the wheel according to claim 15, wherein at least one of the plurality of the rollers comprises a cylindrical inner cylinder member coupled to at least one of the plurality of the bearings, and a stepped hole into which at least one of the plurality of the outer rings is fitted is provided at an end of an inner hole of the inner cylinder member in the axial direction.

18. The manufacturing method of the wheel according to claim 15, wherein the jig comprises a positioning member that presses the collar members respectively toward at least one of the plurality of the inner rings, the positioning member comprises a lower member and an upper member coupled to the lower member, at least one of the lower member and the upper member is provided with a concave portion that receives the pipe material, and when the upper member and the lower member are combined, the concave portion defines a through hole through which the pipe material penetrates in the positioning member.

19. The manufacturing method of the wheel according to claim 18, wherein the pipe material comprises an arc portion on which at least one of the plurality of the rollers and the collar members are mounted, and the jig comprises an urging member that urges the positioning member receiving the pipe material toward a center point of the arc portion.

20. The manufacturing method of the wheel according to claim 14, wherein in the molding step, the pipe material having a semicircular shape and another pipe material having a semicircular shape are joined to form the core body.

* * * * *